METHOD OF MAKING ELECTRICAL MONOGRAIN LAYER

Filed Aug. 1, 1966 2 Sheets-Sheet 1

INVENTOR.
TIES S. TE VELDE
BY
Frank R. Trifari
AGENT

METHOD OF MAKING ELECTRICAL MONOGRAIN LAYER

Filed Aug. 1, 1966 2 Sheets-Sheet 2

INVENTOR.
TIES S. TE VELDE
BY
Frank R. Trifari
AGENT 3,522,339

METHOD OF MAKING ELECTRICAL MONOGRAIN LAYER

Ties Siebolt Te Velde, Emmasingel, Eindhoven, Netherlands, assignor, by mesne assignments, to U.S. Philips Corporation, New York, N.Y., a corporation of Delaware Filed Aug. 1, 1966, Ser. No. 569,248
Claims priority, application Netherlands, Aug. 4, 1965, 6510097
Int. Cl. C04b *35/00;* B29d *9/00;* B29c *24/00*
U.S. Cl. 264—129 15 Claims

ABSTRACT OF THE DISCLOSURE

A method of making electrical monograin layers using semiconductor grains in which the grains are partly embedded in a liquid adhesive layer and then a binder flowed around the free surfaces of the grains and hardened to bind and support the grains. Next, the adhevise is selectively dissolved to expose the formerly embedded grain surfaces and electrdoe means provided to effect electrical charge transport to the exposed grain surfaces.

Figure 1:
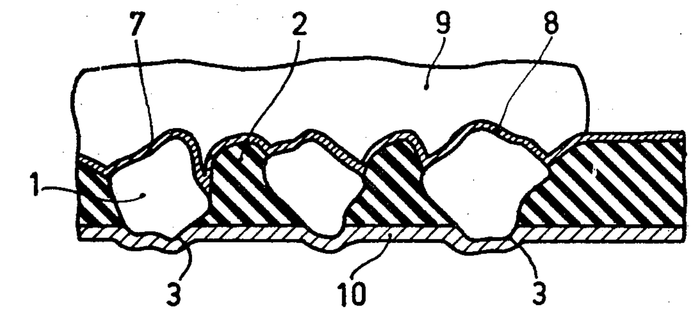

This invention relates to a method of manufacturing an electrical device comprising a layer of electrically active grains having the thickness of substantially one grain. The grains are united by a binder or filler which is electrically insulating, and on at least one side of the layer of grains, the surfaces are exposed for contacting by an electrode. Usually the grains are of a semiconductive material.

Such devices made up of photosensitive grains are useful as detectors for corpuscular or electromagnetic radiation, for instance, as photodiodes and photoresistors. When radiation energy impinges on such photosensitive layer, electric voltage differences or impedance variations are produced therein, which may be detected by means of electrodes arranged on the layer. Similar devices may also be used for the conversion of radiation energy into electric energy, e.g., as solar batteries. Another field of application for such devices according to the invention is the conversion of electric energy into radiation energy, as may be effected, for example, by recombination radiation in semiconductive grains with p-n junctions, by electroluminescence in luminescent grains, and so on.

The advantages of a layer of grains of substantially one grain thickness (hereinafter referred to as monograin layers or devices) is to reduce contact resistances between the grains, increase efficiency, owing to the absence of grains screened against radiation wholly or partly by other grains, and minimize the ratio of weight and material consumption to active surface. With such monograin devices, and even for cases in which the layer thickness is larger, for example, several grain diameters, it is preferred to provide the grains and the binder on a temporary substrate or support to improve its mechanical rigidity during subsequent processing. An electrode layer, which is in electrical contact with the grains, will ultimately have to be provided on the layer of grains on the side of the support. To this end, the grain surfaces on the side of the support have to be freed from the binder and exposed. This is difficult to realize in practice owing to the fact that a film of the binder can easily be formed between the support and the grains, which film is difficult to remove and may cause high and/or unstable contact resistance.

A principal object of the invention is to provide a method by means of which surface parts of the grains on the side of a temporary support are freed from the binder in a simple manner and can be contacted, if desired, which method is applicable to grains of small dimensions, for example, grains or granules having a diameter smaller than 100 microns or even smaller than 50 microns.

These objects are achieved, according to the invention, by providing on a support a liquid adhesive layer in which the grains are sunk or embedded over part of their diameter. Then, a binder is provided between the grains and hardened. Afterwards, the layer of grains with the binder is separated from the support by selectively removing the adhesive layer, such as by selectively dissolving the adhesive layer.

The great advantage of the method described is that both steps necessary for a satisfactory contacting of the grains are carried out in one operation, namely both the removal of the layer of grains from the temporary support, and the removal of the binder from surfaces of the grains on the side of the support. If required, an electrode layer is then provided on that side of the layer of grains to form a stable contact with low contact resistance.

As regards the materials to be used for the adhesive layer and the binder, a great variety of materials or material combinations may be chosen. No stringent requirements are imposed upon the adhesive force of the adhesive layer. It is sufficient that the grains are temporarily held in place by the adhesive layer and are not detached from the adhesive layer when the binder is provided. The properties and the composition of the adhesive layer may be chosen over a wide range. For example, a liquid or a viscous adhesive layer may be used on which a binder is provided. Preferably, a hardenable adhesive layer is used, with the adhesive layer being hardened before the binder is provided. Hardening of the adhesive layer is to be understood to mean in this connection that the adhesive layer is given a hardness or viscosity which is greater than that of the binder to be provided in the non-hardened condition. This prevents the binder in the liquid condition from displacing the adhesive layer. Hardening may be effected in various manners, for example, by polymerization, polycondensation, or evaporation of a solvent.

The selective removal of the adhesive layer may be effected in various manners, for example, by using a readily volatilizable adhesive layer or an adhesive layer which is soluble selectively in suitable solvents, for example, a water-soluble adhesive layer. The adhesive layer is preferably provided in the form of a gel. Such a gel is built up from a liquid (dispersed phase) containing skeleton (dispersion medium) of the gellated substance. The use of a gel as the adhesive layer has the advantage that the liquid dispersed phase which may creep over parts of the grain projecting above the adhesive layer by capillary action, is substantially free of the gellated substance, and thus leaves substantially no residues on the projecting parts of the grains during evaporation. As a result, the binder will afterwards adhere better to these surfaces of the grains. Satisfactory gels are, for example, a polysacchride having a high molecular weight gellated in water, for example, starch, gum, arabic, and the like. Gelatin is very suitable. It can be provided in a simple manner on a support in a homogeneous layer and is easy to remove with warm water.

For readier handling of the layer of grains with the binder when detached from the support, the side of the layers of grains, remote from the support, is preferably coated with a preferably flexible layer of a synthetic material which is hardened before the adhesive layer is selectively removed. The layer of synthetic material may remain connected permanently to the layer of grains as a support, or may connect the layer of grains, if desired, with a permanent supporting member. If the layer of grains is to be provided with an electrode layer on the side of such a permanent layer of synthetic material, it must naturally be provided beforehand.

Preferably the thickness of the adhesive layer is less than half and preferably less than one fifth of the average diameter of the grains. In this manner it is ensured that the grains remain projecting for the greater part above the adhesive layer so that they can better be embedded in the binder, which increases the rigidity. Moreover, the peaks of the grains are approximately located in one plane as a result of which a regularly shaped layer is formed which can be more evenly contacted by the electrode layer.

To accelerate the selective dissolving of the adhesive layer, it is desirable that the layer of grains detach from the temporary support as rapidly as possible. For that purpose, an intermediate layer may be provided on the support before providing the adhesive layer. The intermediate layer decreases the adherence between the supports and the adhesive layer, and/or promotes the penetration of a solvent to be used between the adhesive layer and the supports. It may be, for example, a surface-active substance, which itself need not be soluble, of the solvent to be used. For example, an intermediate layer of nitrocellulose may be used in combination with gelatin as an adhesive layer, whereas lecithin may be used as an intermediate layer in combination with an adhesive layer of saccharose and/or glucose.

The use of an adhesive layer is of particular advantage when grains are used consisting of a core of one material and an enveloping layer of another material. In this case the core and the enveloping layer may consist of different constituents, for example, different semiconductor materials. Alternatively, the core and the enveloping layer may be built up from the same main constituent, but as a result of a difference in doping have different conductivity properties. of particular importance is, for example, the use of semiconductor grains with an enveloping layer which forms a p-n junction with the core. According to a preferred embodiment of the method according to the invention, such grains are subjected to an etching treatment, after hardening the adhesive layer, to remove the enveloping layer from the parts of the grains projecting above the adhesive layer, the parts of the grains embedded in the adhesive layer being protected by the adhesive layer against the action of the etchant used. The binder is then provided. In this manner, a layer of grains having the thickness of one grain is obtained in which the adhesive layer contains only non-etched parts of the grains, and the binder is located on the etched parts of the grains. After the selective removal of the adhesive layer, a layer of grains is obtained in which on one side of the binder the remaining parts of the enveloping layer are accessible for contacting and in which further on the side on the layer of grains remote from the support parts of the grains associated with the core can be exposed, if desired, for example, by grinding. If then electrode layers are provided on either side of the layer of grains, there is no danger of shortcircuiting of the core and the enveloping layer through one of the electrode layers.

Alternatively, instead of one temporary support as used in the preceding methods,two oppositely-located supports may be used, which are both provided with an adhesive layer. The advantage of this is that, by applying the method according to the invention in a similar manner to two sides of the layer of grains, a self-supporting layer of grains with binder is obtained, in which the grains are accessible for contacting on both sides.

Figure 2:
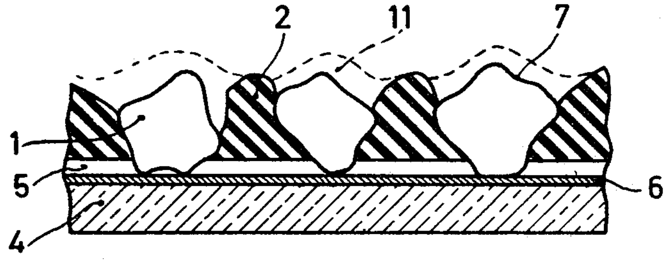
Figure 3:
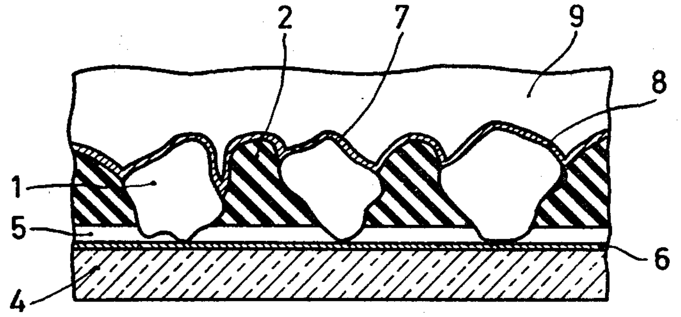
Figure 4:
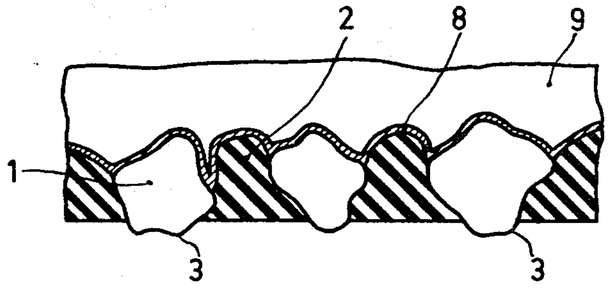
Figure 5:
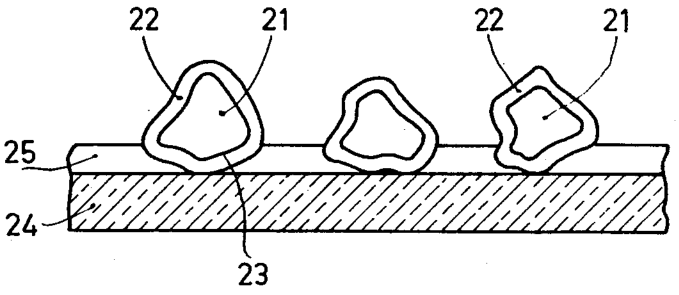
Figure 6:
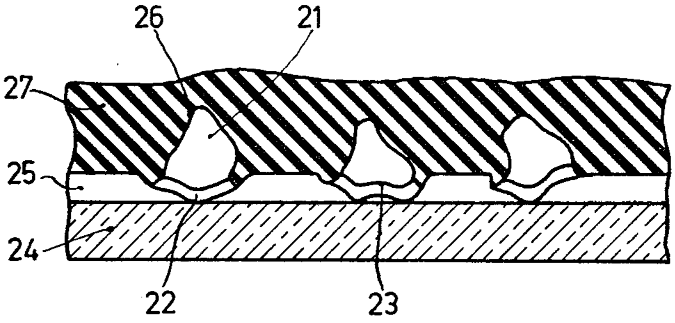
Figure 7:
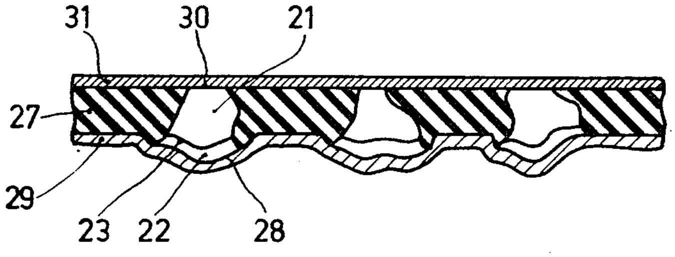

In order that the invention may readily be carried into effect, several embodiments will now be described in greater detail, by way of examples, with reference to the accompanying drawing, in which: FIG. 1 is a diagrammatic cross-sectional view of a part of a solar battery manufactured by using a method according to the invention; FIGS. 2 to 4 are diagrammatic cross-sectional views of the solar battery shown in FIG. 1 in successive stages of manufacture; FIGS. 5 to 7 are diagrammatic cross-sectional views of another solar battery, likewise manufactured by using a method according to the invention, in successive stages of manufacture.

One embodiment of a method according to the invention for the manufacture of a solar battery will now be described with reference to FIGS. 1 to 4. FIG. 1 is a diagrammatic cross-sectional view of a part of a solar battery comprising a monograin layer of semiconductive grains 1, for example, of n-type cadmium sulphide, having an average diameter of the grains of 30 microns, cohering by means of a binder 2. In this embodiment, surface parts 3 and 7 of the grains 1 on either side of the layer of grains are freed from the binder 2. The surface parts 3 are coated with an electrode layer 10 which makes a substantially ohmic contact with the grains 1, and the surface parts 7 are coated with a radiation-permeble electrode layer 8 which make a rectifying contact with the grains 1. Radiation incident through the electrode layer 8 will cause a voltage difference across the rectifying contact, which can be derived from the electrodes 8 and 10. The method is performed, for example, as follows.

On a radiation-permeable, temporary support 4 (FIG. 2), for example, consisting of glass, first an intermediate layer 6 of nitrocellulose, a few microns thick, is provided, for example, by dipping the support 4 in a solution of 10% nitrocellulose in butyl-acetate, the solvent being then evaporated. An adhesive layer 5, approximately 5 microns thick, consisting of gelatin is then provided on the layer 6. This may be effected by dipping the support 4 in a solution of 15% gelatin in water at a temperature of approximately 40° C., after which the support is drawn out of the solution.

The cadmium sulphide grains 1 are then sunk or embedded in the gelatin layer 5, which is still liquid, after which the gelatin layer 5 is dried and the grains not adhering to the support 4 are removed, for example, by shaking or blowing-off. The layer of grains is then coated with a layer 2, 11 consisting of a photochemical substance which has the property of becoming insoluble in an associated developer upon exposure to radiation and remaining soluble in the non-exposed condition. Such substances are known under the name of a negative photoresist. In this example, a negative photoresist is used which is commercially available as "Kodak Photo Resist" (KPR). This technique is described in my copending application, Ser. No. 569,170, filed Aug. 1, 1966. The photoresist layer 2, 11 is exposed through the support 4. The intensity of radiation and the duration of exposure are chosen such that the exposed photoresist parts 2 between the grains become insoluble whereas a result of the stronger radiation adsorption in the grains 1, the parts 11 of the photoresist located above the grains and denoted in FIG. 2 by broken lines remain unexposed. By means of the well-known developing process, the photoresist parts 11 are removed and the parts 2 remain between the grains 1 as a binder.

The exposed surface parts 7 of the grains 1 are then coated (see FIG. 3) by vapor deposition with a transparent electrode layer 8 of copper of approximately 100 A. thickness. This copper layer 8 forms a rectifying contact with the cadmium sulphide grains 1. For purposes of rigidity, a radiation-permeable layer 9 of a hardenable synthetic material, for example, an epoxy resin, thickness approximately 200 microns, is then provided on the electrode layer 8, a part of the copper layer 8 remaining uncoated for purposes of contacting (see FIG. 1). After hardening the layer 9, the adhesive layer 5 of gelatin is removed by selectively dissolving same in water (see FIG. 4). The gelatin layer 5 is easily detached from the intermediate nitrocellulose layer 6 and is then rapidly dissolved. Finally, an electrode layer 10 consisting, for example, of indium is provided on the thus obtained free surface parts 3 of the grains, for example, by vapor deposition; see FIG. 1. The indium layer makes a substantially ohmic contact with the cadmium sulphide grains 1, and may have a thickness of approximately 0.3 micron.

Instead of the gelatin layer 5 used in this embodiment, other adhesive layers may also be used. For example, another water-soluble adhesive layer that may be used is a syrupy solution of one or more water soluble saccharides, for example, a solution of 100 gm. of saccharose and 100 gm. of glucose in 50 ml. of water. To this solution approximately 0.3 gm. of a wetting agent on the basis of esterified sulphonated fatty acids may be added. The solution is provided on the support as a syrup, for example, by dipping, and is then dried. For facilitating the subsequent detachment from the layer of grains, the support may be coated with a thin layer of a surface active substance, for example, lecithin.

Another way of applying a method according to the invention will now be described with reference to FIGS. 5 to 7. In this example (see FIG. 5), semiconductor grains are used consisting of a core 21, of, for example, n-type conductive material, surrounded by an enveloping layer 22 consisting of p-type material, so that a p-n junction 23 is formed between the core 21 and the enveloping layer 22. The method is carried out, for example, as follows.

On a temporary substrate or support 24 (FIG. 5), a liquid adhesive layer 25 is provided. The grains 21, 22 are sunk or embedded in the liquid adhesive layer 25, after which the adhesive layer 25 is hardened. Then, the enveloping layer 22 is etched away from the parts of the grains projecting outside the adhesive layer (see FIG. 6) so that free surface parts 26 belonging to the core 21 are obtained and the p-n junction 23 also appears at the surface. A binder 27 to be hardened is then provided on the adhesive layer and the free surface parts 21, 22 of the grains. After hardening the binder 27, the adhesive layer 25 is removed by selective dissolution (FIG. 7) as a result of which free surface parts 28 belonging to the enveloping layer 22 are exposed at the side of the support. The p-n junction 23 remains covered by the binder 27. Then an electrode layer 29 is provided on the free surface parts 28 of the grains 21, 22 which makes a substantially ohmic contact with the surface parts 28. Free surface parts 30 belonging to the core 21 are then obtained on the oppositely located side of the layer of grains, for example, by grinding off the binder 27. A second electrode layer 31 is then provided on the binder 27 and the surface parts 30, which electrode layer makes a substantially ohmic contact with the surface parts 30.

With an electrode layer 29 capable of passing radiation, a solar battery is obtained in which radiation which is incident through the electrode layer 29 produces a voltage difference across the p-n junction 23 which can be collected at the electrode layers 29 and 31. In this manner also an electroluminescent panel may be formed, in which the p-n junction 23 is biased in the forward direction through the electrode layers 29 and 31, and in which in the proximity of the junction 23 injection recombination radiation is produced which can emerge through the electrode layer 29.

In the preceeding example, grains of n-type CdTe surrounded by a p-type conductive layer 22 can be used which can be obtained, for example, by indiffusion of phosphorus according to methods commonly used in semiconductor technology. As the material for the adhesive layer 25 may be used, for example, polystyrene of polymethylmethacrylate which is soluble in aromatics, such as benzene or toluene. Concentrated potassium hydroxide solution may be used as the etchant against which polystyrene and polymethylmethacrylate are resistant. As a binder 27 may then be used an epoxy resin which is also resistant to aromatic solvents such as benzene and toluene.

It will be clear that the invention is not restricted to the examples described, but that many applications are possible within the scope of the present invention and also many different materials may be used. Notably, the adhesive layer may be formed by many materials, other than those mentioned here, insofare as they can be provided on a support in a liquid or syrupy condition to cause the grains to adhere to the support and can be removed selectively by dissolution or in a different manner without the grains or the binder being attacked. Those skilled in this art will have no difficulty in choosing suitable materials for the adhesive layer and the binder following the principles enunciated above.

While in the examples described, the electrodes or current supply means are shown as metal contacts, there may be constructions wherein one or both is replaced by a flow of charged particles, such as ions or electrons, which are impinged on the surfaces of the grains to effect a current supply or charge transport thereto; hence the term "electrode" as used herein should be accorded a meaning commensurate with the function required to be carried out by the electrodes.

It will further be evident that the invention is not limited to the specific active materials recited in the several examples described above. In general, all semiconductive materials, whether monocrystalline or polycrystalline, which are available in granular form, i.e., in small pieces or particles, for example, crystallites, and exhibit a property sensitive to radiation or which generate radiation are suitable for use in the device of the invention. Such materials include, for example, silicon, cadmium telluride, zinc selenide and others well known to those skilled in this art. As is evident, the method of the invention is concerned with the technique for producing the device and the choice of active materials and electrode materials is not critical within the broad scope of my teachings, though certain combinations of materials are preferred because of the superior results obtained. Nor for that matter are the deposition techniques for the various electrode materials critical. Also the layer thicknesses given are merely illustrative and should not be considered as limiting the scope of my invention.

Reference is also made to my copending application Ser. No. 569,204, filed Aug. 1, 1966, for a description of a technique for improving the electrical contact of the radiation permeable electrode to the active grains without unduly attenuating the radiation incident on or emerging from the grains.

While I have described my invention in connection with specific embodiments and applications, other modifications thereof will be readily apparent to those skilled in this art without departing from the spirit and scope of the invention as defined in the appended claims.

What is claimed is:

1. A method of making an electrical device comprising a layer of electrically active grains united by a binder with surface portions of the grains at least on one side of the layer being exposed for charged particle flow from an electrode, comprising the steps of providing on a temporary support a liquid layer of adhesive, providing the electrically active grains on the adhesive layer and embedding them therein over a part of their diameter, providing a binder in contact with parts of the grain not embedded in the adhesive layer and hardening same to bind the grains together, then separating the layer of bound grains from the temporary support by selectively removing the adhesive layer to expose the surface portions of the grains formerly embedded therein, and providing electrode means to effect electrical charge transport to exposed grain surface portions.

2. A method as set forth in claim 1 wherein the adhesive layer is hardened before the binder is provided.

3. A method as set forth in claim 2 wherein the adhesive layer is a gel.

4. A method as set forth in claim 3 wherein the adhesive layer is gelatin.

5. A method as set forth in claim 1 wherein an intermediate layer is provided on the temporary support before providing the adhesive layer, said intermediate layer having the property of enabling the adhesive layer to be more easily selectively removed.

6. A method as set forth in claim 5 wherein the intermediate layer is nitrocellulose, and the adhesive layer is gelatin.

7. A method as set forth in claim 5 wherein the intermediate layer is lecithin, and the adhesive layer is a water solution containing saccharose and glucose.

8. A method as set forth in claim 1 wherein the adhesive layer is dissolved by subjecting same to a solvent.

9. A method as set forth in claim 1 wherein the adhesive layer is provided in a thickness which is less than half of the average diameter of the grains.

10. A method as set forth in claim 1 wherein the layer of grains is coated with a layer of a hardenable synthetic material before the adhesive layer is selectively removed.

11. A method as set forth in claim 1 wherein a metallic electrode is applied to the grain surfaces exposed when the adhesive layer is removed.

12. A method of making an electrical device comprising a substantially single layer of semiconductive grains united by a binder with surface portions of the grains at least on one side of the layer being exposed for contacting by an electrode, comprising the steps of providing on a temporary support a liquid layer of adhesive, said adhesive layer being thinner than the average grain diameter, providing the grains on the adhesive layer and embedding them therein over only a part of their diameter, providing a binder in contact with the parts of the grain not embedded in the adhesive layer and hardening same to bind the grains together, then separating the layer of bound grains from the temporary support by selectively dissolving the adhesive layer to expose the surface portions of the grains formerly embedded therein, and providing an electrode in contact with the exposed grain surface portions.

13. A method as set forth in claim 12 wherein the grains have a core of one type conductivity and an outer layer of the opposite type conductivity, and after the grains are embedded in the adhesive layer they are subjected to an etchant for removing the outer layer to expose the core, followed by the provision of the binder.

14. A method of making an electrical device comprising a layer of electrically active grains united by a binder with surface portions of the grains at least on one side of the layer being exposed, comprising the steps of providing on a first temporary bottom support a liquid layer of adhesive, providing the electrically active grains on the adhesive layer and embedding them therein over a part of their diameter, providing a second top temporary support with a layer of adhesive thereon in contact with grain portions not embedded in the adhesive layer on the first support, providing a binder in contact with parts of the grains not embedded in the adhesive layers and hardening same to bind the grains together, and then separating the layer of bound grains from the temporary supports by selectively removing the adhesive layers.

15. A method as set forth in claim 12 wherein surface portions at the opposite side of the grains are exposed and electrode means provided to effect electrical charge transport to exposed surface portions at the opposite side.

References Cited

UNITED STATES PATENTS

| | | | |
|---|---|---|---|
| 2,904,613 | 9/1959 | Paradise | 136—89 |
| 1,082,231 | 12/1913 | Nale | 264—256 |
| 1,086,116 | 2/1914 | Zagelmeyer | 264—112 |
| 1,162,172 | 11/1915 | Jones | 264—112 X |
| 1,169,985 | 2/1916 | Mickelson | 264—255 |
| 2,454,910 | 11/1948 | Carr | 264—112 |
| 2,856,541 | 10/1958 | Jacobs | 117—210 X |
| 3,031,344 | 4/1962 | Sher | 117—227 X |
| 3,097,080 | 7/1963 | Weir. | |
| 3,275,466 | 9/1966 | Kell | 117—227 X |

ROBERT F. WHITE, Primary Examiner

N. RUSHEFSKY, Assistant Examiner

U.S. Cl. X.R.

29—569, 576; 136—89; 156—3, 7; 264—104, 162, 255, 261